United States Patent
Taylor et al.

(10) Patent No.: US 8,272,743 B2
(45) Date of Patent: Sep. 25, 2012

(54) PROJECTION OF IMAGES ONTO TANGIBLE USER INTERFACES

(75) Inventors: Stuart Taylor, Cambridge (GB); Shahram Izadi, Cambridge (GB); Daniel A. Rosenfeld, Seattle, WA (US); Stephen Hodges, Cambridge (GB); David Alexander Butler, Cambridge (GB); James Scott, Cambridge (GB); Nicolas Villar, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/280,191

(22) Filed: Oct. 24, 2011

(65) Prior Publication Data

US 2012/0038891 A1    Feb. 16, 2012

Related U.S. Application Data

(63) Continuation of application No. 12/114,421, filed on May 2, 2008, now Pat. No. 8,042,949.

(51) Int. Cl.
*G03B 21/14* (2006.01)
*G06F 3/041* (2006.01)

(52) U.S. Cl. ............. 353/28; 353/79; 345/173; 715/716

(58) Field of Classification Search .................... 353/28, 353/79, 121; 345/1.2, 9, 56, 173, 174, 175; 715/701, 702, 716, 717, 718; 349/5, 7, 17; 359/443; 348/14.03, 14.07, 14.11

See application file for complete search history.

(56) References Cited

U.S. PATENT DOCUMENTS

| | | | |
|---|---|---|---|
| 5,422,693 | A | 6/1995 | Vogeley et al. |
| 5,644,369 | A | 7/1997 | Jachimowicz et al. |
| 5,784,138 | A | 7/1998 | Kollarits et al. |
| 6,052,231 | A | 4/2000 | Rosenbluth |
| 6,292,295 | B1 | 9/2001 | Yamashita et al. |
| 6,417,966 | B1 | 7/2002 | Moshrefzadeh et al. |
| 6,616,284 | B2 | 9/2003 | Yaniv et al. |
| 6,755,534 | B2 | 6/2004 | Veligdan et al. |
| 6,820,982 | B1 | 11/2004 | Liang et al. |
| 7,088,507 | B2 | 8/2006 | Peterson |
| 7,230,758 | B2 | 6/2007 | Huang |
| 2003/0058416 | A1 | 3/2003 | Safran et al. |
| 2007/0024822 | A1 | 2/2007 | Cortenraad et al. |
| 2007/0091431 | A1 | 4/2007 | Mezouari et al. |
| 2007/0296920 | A1 | 12/2007 | Mezouari et al. |
| 2008/0029691 | A1 | 2/2008 | Han |
| 2009/0015799 | A1 | 1/2009 | Luciano |
| 2009/0219253 | A1 | 9/2009 | Izadi et al. |

(Continued)

FOREIGN PATENT DOCUMENTS

JP    2003075865    3/2003

(Continued)

OTHER PUBLICATIONS

Brown, et al., "Magic Lenses for Augmented Virtual Environments". IEEE Computer Graphics and Applications, Jul. 2006, 64-73.

(Continued)

*Primary Examiner* — William C Dowling
(74) *Attorney, Agent, or Firm* — Lee & Hayes, PLLC

(57) ABSTRACT

The techniques described herein provide a surface computing device that includes a surface layer configured to be in a transparent state and a diffuse state. In the diffuse state, an image can be projected onto the surface. In the transparent state, an image can be projected through the surface.

20 Claims, 12 Drawing Sheets

U.S. PATENT DOCUMENTS

2009/0276734 A1 11/2009 Taylor et al.

FOREIGN PATENT DOCUMENTS

| JP | 2004184979 A | 7/2004 |
| JP | 2005165864 A | 6/2005 |
| JP | 2007017664 A | 1/2007 |
| JP | 2007081864 A | 3/2007 |
| JP | 2007514242 A | 5/2007 |
| JP | 2009545828 A | 12/2009 |
| WO | WO0052527 | 9/2000 |
| WO | WO2005069073 A1 | 7/2005 |

OTHER PUBLICATIONS

Cao, et al., "Interacting with Dynamically Defined Information Spaces using a Handheld Projector and a Pen", ACM, UIST, Oct. 2006, pp. 225-234.

FOS-PSCT Optical-Shutter, retrieved at <<http://www.Ictecdisplays.com/files/datasheets/FOS-PSCT.pdf>>, LC-Tec Displays AB, Jun. 2, 2008, pp. 1-15.

Han, Low-Cost Multi-Touch Sensing Through Frustrated Total Internal Reflection, retrieved on Feb. 14, 2008 at http://delivery.acm.org/10.1145/1100000/1095054/p115-han.pdf? key1=1095054&key2=3673092021&coll=GUIDE&dl=GUIDE&CFID=54816371&CFTOKEN=18959709, Media Research Laboratory, pp. 115-118.

Hodges, et al., "ThinSight: Versatile Multi-touch Sensing for Thin Form-factor Displays", ACM, UIST, Oct. 2007.

Kakehi, et al., "Tablescape Plus: Interactive Small-Sized Vertical Displays on a Horizontal Tabletop Display", Second Annual IEEE International Workshop on Horizontal Interactive Human Computer Systems, Oct. 2007, pp. 155-162.

Krueger, et al., "Videoplace—An Artificial Reality", ACM, CHI '85 Proceedings, Apr. 1985, pp. 35-40.

Lee, et al., "Automatic Projector Calibration with Embedded Light Sensors", UIST, ACM, Oct. 2004, 4 pages.

Malik, et al., "Visual Touchpad: A Two-handed Gestural Input Device", ICMI, ACM, Oct. 2004, 8 pages.

Matsushita, et al., HoloWall: Designing a Finger, Hand, Body, and Object Sensitive Wall, UIST, ACM, Oct. 1997, pp. 209-210.

Microsoft Surface, retrieved on Jul. 28, 2008 at <<http://www.microsoft.com/surface/index.html>>, 2 pages.

Miyahara, et al., "Hotaru: Intuitive Manipulation Techniques for Projected Displays of Mobile Devices", retrieved on Jul. 28, 2008 at <<http://www.itl.t.u-tokyo.ac.jp/~sugi/hotaru/>>, pp. 1-4.

Olsen, et al., "Laser pointer interaction", ACM, CHI, Mar. 31-Apr. 5, 2001, 7 pages.

Password, "Making Electronic Games More Sociable", Philips Research Technology Magazine, Issue 26, Feb. 2006, pp. 24-27.

Projective transformation, retrieved on Jul. 28, 2008 at http://en.wikipedia.org/wiki/Projective_transformation, Wikipedia, Jun. 22, 2008, pp. 1-26.

Raskar, et al., "A Self Correcting Projector", IEEE Computer Society Conference on Computer Vision and Pattern Recognition (CVPR), Dec. 2001, 8 pages.

reacTIVision 1.3, retrieved on Feb. 14, 2008 at <<http://reactable.iua.uptedu/?software>>, pp. 1-7.

Shutters, retrieved on Feb. 14, 2008 at <<http://www.displaytech.com/pdf/photonics_shutters_ds.pdf>>, Displaytech, 2 pages.

Tangible User Interfaces, retrieved on Feb. 14, 2008 at <<http://www.cs.tufts.edu/~jacob/workshop/papers/ishii.pdf>>, CHI 2006 Workshop, pp. 1-17.

Wellner, "Interacting with paper on the DigitalDesk", University of Cambridge, Clare Hall, Oct. 1993, pp. i-vii, 1-96.

Wii Fit, retrieved on Jul. 28, 2008 at <<http://uk.wii.com>>, 1 page.

Wilson, "PlayAnywhere: A Compact Interactive Tabletop Projection-Vision System", UIST, ACM, Oct. 2005, 10 pages.

Wilson, "TouchLight: An Imaging Touch Screen and Display for Gesture-Based Interaction", ICMI, ACM, Oct. 2004, 8 pages.

Wu, et al., "Multi-Finger and Whole Hand Gestural Interaction Techniques for Multi-User Tabletop Displays", UIST, ACM, vol. 5, Issue 2, 2003, pp. 193-202.

Notice of Rejection for JP Application 2011-507510, mailed Mar. 16, 2012, 15 pages.

PROJECTION OF IMAGES ONTO TANGIBLE USER INTERFACES

PRIORITY APPLICATIONS

This application is a continuation of and claims priority from U.S. patent application Ser. No. 12/114,421, titled "Projection of Images onto Tangible User Interfaces", filed on May 2, 2008, which is herein incorporated by reference.

BACKGROUND

Surface computing devices have been developed which comprise a surface which is used both for displaying the graphical user interface and for user input. The surface computing devices detect the user's fingers on the surface or detect real, tangible objects which are manipulated by a user and this is referred to as a 'tangible user interface' (TUI). In an example, the objects may be gaming pieces which may be moved by a user and the motion can be detected by the surface computing device. The surface computing devices may be designed for use by a single user or they may be multi-user devices.

There are several techniques which have been developed for tracking or detecting objects on the surface, for example, using cameras to image objects from above the surface (a 'top-down' configuration) or using light sources to illuminate the surface from below and cameras to detect light reflected by objects in contact with the surface (a 'bottom-up' configuration). Another technique relies on frustrated total internal reflection (FTIR) to cause scattering of light when a fingertip is in contact with the surface, and this scattered light is detected by a camera below the surface.

The embodiments described below are not limited to implementations which solve any or all of the disadvantages of known surface computing devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The techniques described herein provide a surface computing device that includes a surface layer configured to be in a transparent state and a diffuse state. In the diffuse state, an image can be projected onto the surface. In the transparent state, an image can be projected through the surface.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
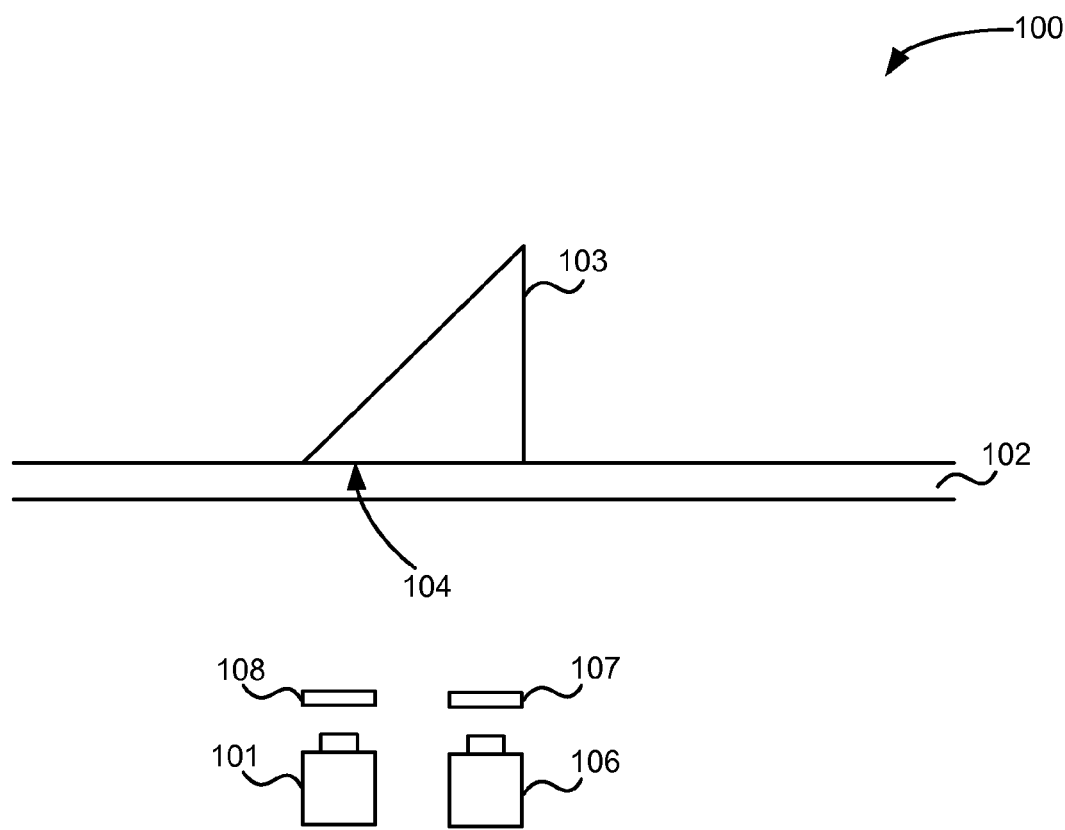
FIG. 1 is a schematic diagram of a surface computing device.

FIG. 1 is a schematic diagram of a surface computing device 100 which comprises a projector 101 which is located behind a switchable surface 102, i.e. the projector 101 is on the opposite side of the switchable surface to a user (not shown in FIG. 1). The switchable surface 102 is has two modes of operation: a 'display mode', in which the surface is substantially diffuse (to visible light) and any rear-projected image or other graphical data is displayed on the surface, and a 'projection mode', in which the surface is substantially transparent (to visible light) and any rear-projected image (or other graphical data) is projected through the surface. If an object, such as object 103, is placed on (or near) the surface 102, the image may be projected into the bottom face 104 of the object when the device is in projection mode.

For the purposes of explanation, the description herein refers to the projection of graphical data through and/or on to the surface (e.g. by projector 101). This graphical data may comprise any form of image or data, including digital or analog data. It will be appreciated that any form of graphical data may be projected by the projector through the surface and the choice may be application dependent. In some examples, text or a graphical user interface (GUI) may be projected (which may comprise text and/or images), in other examples, an image, which may be still or moving, may be projected, and in further examples a single color or other light pattern (e.g. a structured light pattern) may be projected.

Figure 2:
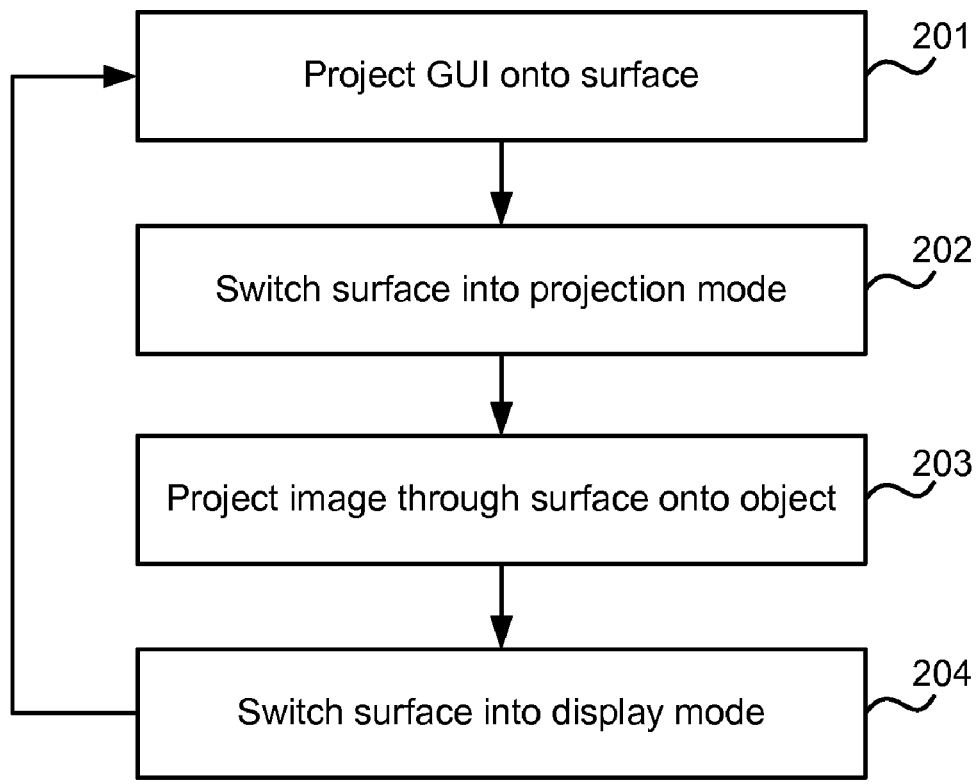
FIG. 2 shows a flow diagram of an example method of operation of a surface computing device.

FIG. 2 shows a flow diagram of an example method of operation of the surface computing device 100. In this example, the switchable surface 102 is initially in display mode and a graphical user interface for the surface computing device or any other graphical data is projected onto the surface (block 201). The surface is then switched into projection mode (block 202), i.e. it is switched from substantially diffuse to substantially transparent to visible light, and graphical data is projected through the surface onto an object (block 203). The switchable surface may then be switched back to display mode (block 204) and the method may be repeated.

The switching of the surface (in blocks 202 and 204) may be done at any rate. In an example, the surface may be switched at a rate which exceeds the threshold for flicker perception (e.g. at 60 Hz). At such a rate a user will see both the GUI (or other graphical data) on the surface and the graphical data (which may be another GUI) projected onto the object. Such an apparatus and method therefore enables display of two different elements of graphical data, GUIs or other forms of data substantially simultaneously. These two elements may be totally unrelated and may be independently controlled. In other examples the same graphical data may be projected on to and through the surface (e.g. to project onto a second display surface in addition to the switchable surface).

In order to display different graphical data onto the surface and through the surface, a projector may be used which can switch at a high enough rate between elements of graphical data (e.g. between images) and the projector may be synchronized with the switching of the surface (e.g. in blocks 202 and 204). Alternatively, the system may comprise a second projector 106 and a switchable shutter (or filter) 107, 108 may be provided in front of each projector 101, 106. In such an embodiment, the shutters 107, 108 may be switched in synchronization with the switchable surface 102 and the projectors 101, 106 may project continuously (or be switched at a lower rate). Alternatively, a projector 101 may be provided to project graphical data through the surface whilst an alternative display means, such as an LCD (liquid crystal display) panel may be used in display mode to project graphical data onto the surface in display mode. In such an example, the projector 101 may act as the backlight for the LCD panel or a separate backlight may be provided. For the purposes of the following explanation only, projectors will be used to provide the graphical data in the display mode, although it will be appreciated that in other examples, any display means which can be projected through may be used.

The dual projection capabilities of the surface computing device 100 can be used to create interesting layering and magic lens effects. Instead of projecting two entirely unrelated images, the graphical data projected through the surface may be visually connected to the graphical data being projected on the surface. For example, the graphical data projected on the surface could be an image of a car, with graphical data comprising an associated image that reveals the inner workings of the car being projected through the surface. In this example scenario, if a user passes a piece of translucent material (or other object) over the car, it will reveal this otherwise hidden information, creating a two layered effect. Different translucent objects of varying forms and shapes can be used to exploit this capability, each effectively acting as a physical magic lens. The object does not have to be resting on or even in contact with the surface. It can be lifted off the surface and the through surface projected graphical data is maintained. The object may be manipulated in six degrees of freedom. Further examples are described below.

The projectors 101, 106 may be any kind of projector and examples include, but are not limited to, LCD, LCOS (liquid crystal on silicon), DLP (Digital Light Processing™) and laser projectors. The projectors may be fixed or steerable. The switchable shutters 107, 108 (or filters/mirrors) may be any kind of switchable shutter and an example is a ferroelectric LCD shutter.

The switchable surface 102 may comprise a sheet of Polymer Stabilized Cholesteric Textured (PSCT) liquid crystal or Polymer Dispersed Liquid Crystal (PDLC). These materials can be electrically switched between substantially diffuse and transparent states by applying a voltage. PSCT is typically capable of being switched at higher rates than PDLC and PSCT can be switched at rates which exceed the threshold for flicker perception (e.g. it may be switched at around 60 Hz).

In an example implementation using PSCT, the surface may be switched at 60 Hz, with each cycle consisting of around 8.3 ms when 150V is applied to the screen to make it clear followed by 8.3 ms with no applied voltage, at which point it returns to its natural diffuse state. The exact proportion of time in each state (i.e. the duty cycle) can be varied according to specific needs of the system design. Increasing the diffuse interval at the expense of the clear interval, for example, will increase display brightness on the surface at the cost of reducing brightness of the through projection. It will also decrease the available light to the camera for imaging through the surface. In this example, the polarity of the 150V may be reversed on alternate cycles and a driver circuit based on an H-bridge architecture may be used, with each side of the switchable surface connected to one half-bridge, capable of switching between 0 and +150V. A potential of 0V, +150V or −150V may therefore be applied across the PSCT-LC depending on whether neither, the left or the right half-bridges are enabled (respectively). Each half-bridge may be implemented as a complementary emitter follower, made from NPN and PNP power audio transistors. These transistors are capable of delivering the high current (~4 A) required to switch the surface, which is effectively a nonlinear capacitor of around 6 µF, quickly enough. The power output stage may be driven through an additional current gain stage. Electrical isolation between the high-voltage circuitry and the rest of the system may be achieved through the use of an opto-coupled level shifter. It will be appreciated that this is just one possible implementation and is described by way of example only.

Alternatively, the switchable surface may use any other technology or arrangement to provide the two modes of operation, e.g. a gas filled cavity which can be selectively filled with an optically diffusing or transparent gas or a mechanical device which can switch dispersive elements into and out of the plane of the surface (e.g. in a manner which is analogous to a Venetian blind). In all these examples, the surface can be electrically switched between two modes, one in which it is substantially diffuse to visible light one and one in which it is substantially transparent to visible light. The switchable surface may, in some examples, also be able to be switched into intermediate modes in which it has differing degrees of diffusivity.

In some examples, the whole of the surface 102 may be switched between modes (in blocks 202 and 204) and in other examples, only part of the screen may be switched between states. Depending on the granularity of control of the area which is switched, in some examples, a transparent window may be opened up in the surface (e.g. behind an object placed on the surface) whilst the remainder of the surface stays in its substantially diffuse state. Switching of portions of the surface may be useful where the switching speed of the surface is below the flicker threshold to enable graphical data (such as an image or graphical user interface) to be displayed on a portion of the surface whilst projection occurs through a different portion of the surface and onto an object.

In other examples, the surface may not be switched between modes but the mode of operation may be dependent on the nature of the light incident upon the surface. For example, the surface may act as a diffuser for one orientation of polarized light and may be transparent to another polarization. In another example, the optical properties of the surface, and hence the mode of operation, may be dependent on the angle of incidence of the incident light.

Although FIG. 1 shows a flat surface, in other examples the switchable surface 102 may be curved or non-planar. The surface may be rigid or flexible. Furthermore, the surface computing device 100 may comprise additional elements, such as an capture device, not shown in FIG. 1.

As described above, when the system is in projection mode, graphical data may be projected through the surface and onto an object 103 (block 203). This object may be in contact with the surface, close to the surface or distant from the surface. The object onto which the graphical data is projected may be designed to redirect the light (e.g. through reflection/refraction) to project the graphical data onto a face of the object. The face onto which the graphical data is projected may be parallel to the switchable surface or may not be parallel to the surface. In another example, the projected light may be redirected by the object such that the light is emitted from the object at an angle which is different to the angle at which the light is projected through the surface and this may enable projection onto a further object. The objects may be passive or may be active (i.e. contain electronic circuitry) and examples are described below.

The projection through the surface, which may be of different graphical data to that projected onto the surface (in display mode) may be used to provide an alternative display surface (e.g. to provide a private display), to augment the appearance of the object (e.g. to project an image onto a piece of paper or an animated face onto a games piece), for sensing (e.g. for touch detection on the object or for a beam-break sensor) or for other purposes. The objects may provide tangible user interface (UI) controls for the surface computing device or otherwise provide a user input to the surface computing device. Examples of various objects and their uses are described below.

Figure 3:
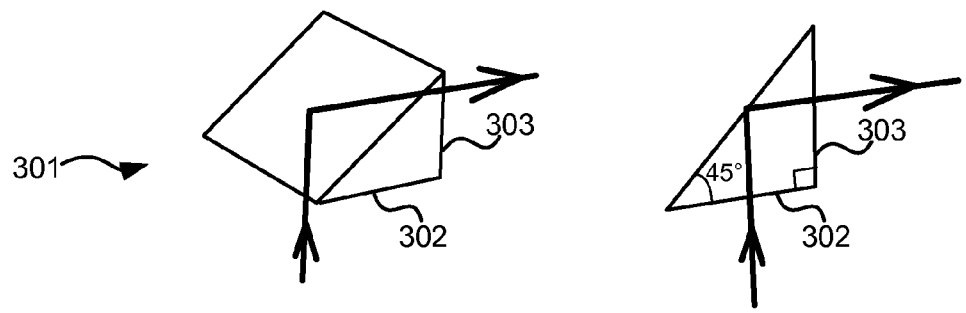
FIGS. 3 and 4 show schematic diagrams of various passive objects which may be used with a surface computing device.
Figure 3:
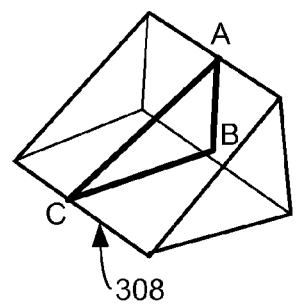
Figure 3:
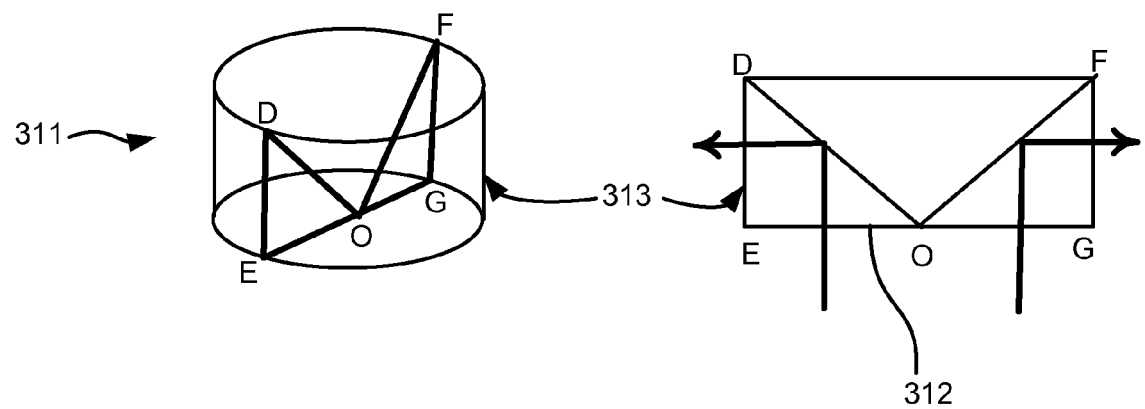

FIG. 3 shows schematic diagrams of various passive objects which redirect the light which enters the object on one face onto another face of the object. This light has been projected through the switchable surface in projection mode. A first example of a passive object 301 comprises a right-angled isosceles prism and light incident on the bottom face 302 is reflected through 90° as shown in FIG. 3. This relies on total internal reflection (TIR) properties of prisms, although an object with a mirrored surface may alternatively be used. If the vertical face 303 of the object is frosted or otherwise provided with a diffusing or scattering layer, any graphical data projected onto the bottom face 302 of the prism will be displayed on the vertical face 303. Such an object 301 may therefore be used to provide a private display for a user (e.g. to display gaming pieces or confidential information), particularly where the surface computing device is a multi-user device.

A second example of a passive object 311 comprises a narrow section ABC of a prism 308 which has been swept through 360° about point C. Light rays incident on the flat bottom face 312 (EO, OG) will again undergo total internal reflection (on face DO, OF) and emerge from the outer curved surface 313 (DE, FG). If a two dimensional (2D) image (or other graphical data) is projected onto the object's bottom flat surface 312, the image will be reflected out through the curved sides of the object; however if suitable diffuser material is attached to the curved surface (or a diffusing surface finish provided), the emerging light will form an image on the curved surface which is visible to the human eye.

Figure 4:
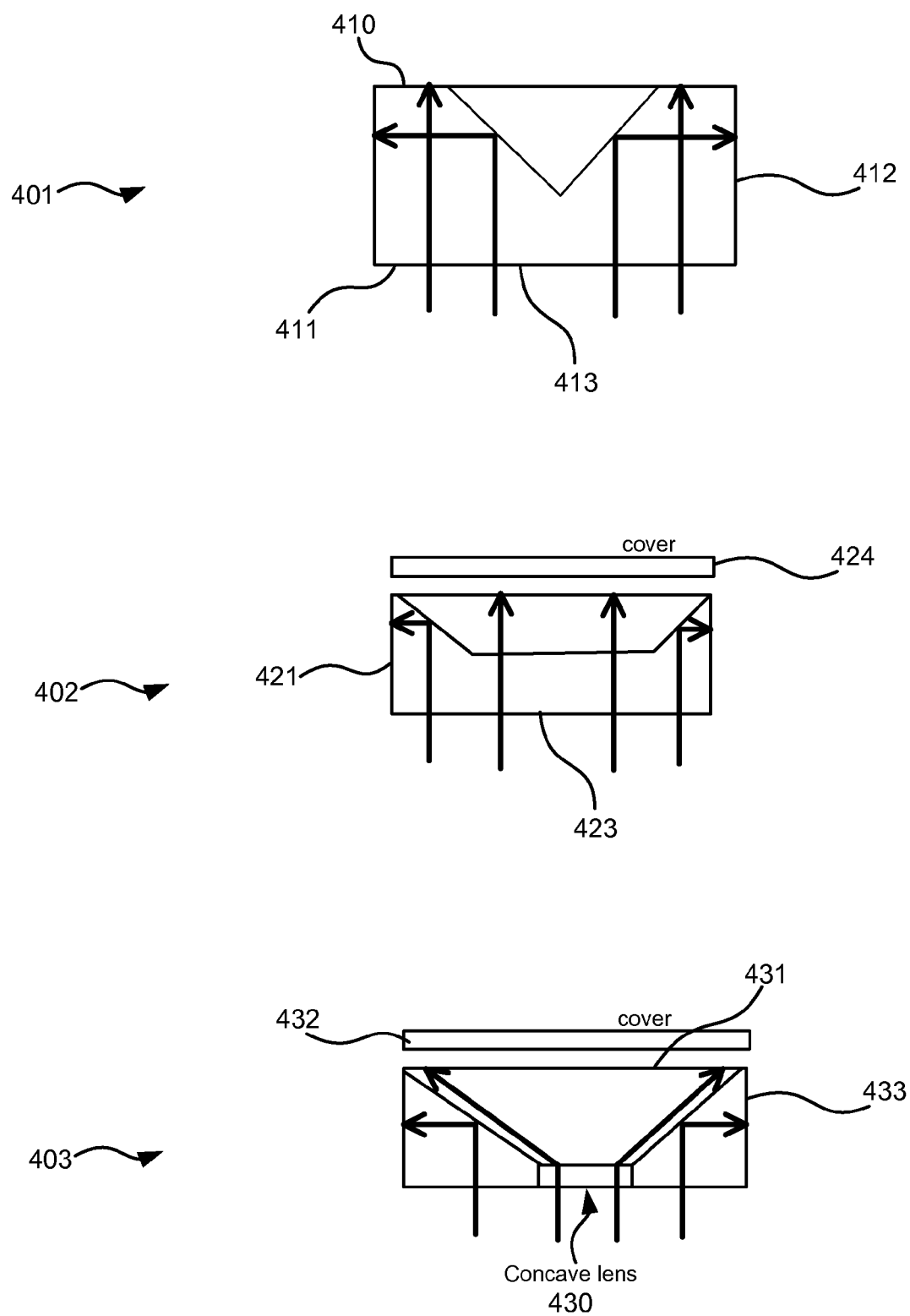

FIG. 4 shows schematic diagrams of variants of object 311 where the light which is incident on the bottom face is redirected onto more than one face, resulting in graphical data being displayed on more than one face of the object. A first variant 401 comprises an outer cylindrical section having parallel top and bottom faces 410, 411. Any light projected into this cylindrical region from below will emerge from the top surface of the object and by placing a diffuser on the top surface (or providing a diffusing surface finish) graphical data may be simultaneously be formed on both the outer curved surface 412 and a ring on the top surface 410. As the two projected elements of graphical data (on surfaces 412, 410) are derived from different areas of the incident graphical data (on the bottom face of the object 411, 413), the projected elements of graphical data may be controlled independently.

A second variant 402 also enables projection onto both the top surface 420 and the curved outer surface 421, but this variant enables projection onto a central region of the top surface (instead of an outer ring as shown in the previous variant 401). The centre section of the object has a surface 422 which is parallel to the bottom surface 423. The graphical data may be made visible on the top surface through the addition of a diffusing layer 424 or alternatively by adding a diffusing layer (or surface) finish to the flat central surface 422. A further variant, not shown in FIG. 4, is a combination of the two variants 401, 402 described above. This provides three different projection areas: the curved outer face, an outer ring on the top surface and a central portion of the top surface, and as described above, projection onto each area may be controlled independently.

A further variant 403 is also shown in FIG. 4, which comprises a lens, such as concave lens 430, in the central section of the object. Graphical data projected from below onto this region is expanded to fill the whole (or a large part) of the top surface 431 of the object and as described above, a diffusing layer 432 may be provided. In such an example, the size of the projected graphical data is traded off against the resolution of the projected graphical data, i.e. the lens increases the size of the projected graphical data on the top surface but the projected resolution remains the same, so the effective resolution of the graphical data on the top surface will be less than the resolution of the graphical data projected onto the curved sides 433. The lens may introduce distortion, but this can be corrected for in the graphical data that is projected. Whilst a concave lens is shown in FIG. 4, in other examples other lenses may be used, such as a compound lens or a convex lens.

It will be appreciated that the examples described above are just some of many different example objects which may be used in conjunction with a switchable surface layer to direct the light projected through the surface and provide projection on different, and in some cases, multiple surfaces of the object. Dependent on the design of the object and the projected graphical data, the graphical data may be projected over all the surface (or surfaces) of the object. Whilst the examples shown have a flat upper surface, this is by way of example only, and other objects may comprise a curved upper surface. In a further example, the object may be substantially hemispherical.

Although the objects may be in contact with the switchable surface, in other examples, the objects may be separated from the surface e.g. the objects shown in FIG. 4 may have legs or other members to space them from the switchable surface. Where the projection apparatus (which may, for example, comprise more than one projector and switchable filters) and surface can be switched at a rate which exceeds the flicker threshold, this may enable different graphical data to be projected onto and under the object.

The through surface projected graphical data may be changed dependent on the detected position of the object on to which the graphical data is projected. This detected position may be a position in a plane substantially parallel to the switchable surface (e.g. an x-y position), the separation (e.g. a z position) between the object and the surface and/or the orientation of the object (e.g. the tilt or rotation). In a first example, a first color may be projected onto a diffuse object when it is in contact with the surface and a second color may be projected on to the object when it is not in contact with the surface. In a second example, a zoom effect may be applied to the projected graphical data as the object is moved towards or away from the surface, such that the object is analogous to a magnifying glass. In a third example, different graphical data may be projected onto the object dependent upon its position (as in the magic lens example described above).

The contact between the diffuse object and the surface may be detected in any manner (e.g. using a touch detection method). When the diffuse object is lifted off this surface this may also be detected using touch detection or alternatively through depth detection (e.g. using a time of flight camera or detection of a structured light pattern projected onto the object). When a change in the separation of the object and the surface is detected, the projected light may be changed, for example to a different color or different graphical data. In an example, the projected graphical data may be adjusted so that it remains in focus or remains the same size on the object etc. This provides 3D based interactions and 3D display.

The objects used in combination with the switchable surface may have integrated features or embedded electronics to enable their position relative to the surface to be tracked. Examples include use of passive (retro-reflective) or active (powered LED) tags, which may use visible or infra-red (IR) light or light of another wavelength. Other examples include use of wireless communications (e.g. RFID tags). Further examples are described in more detail below.

Figure 5:
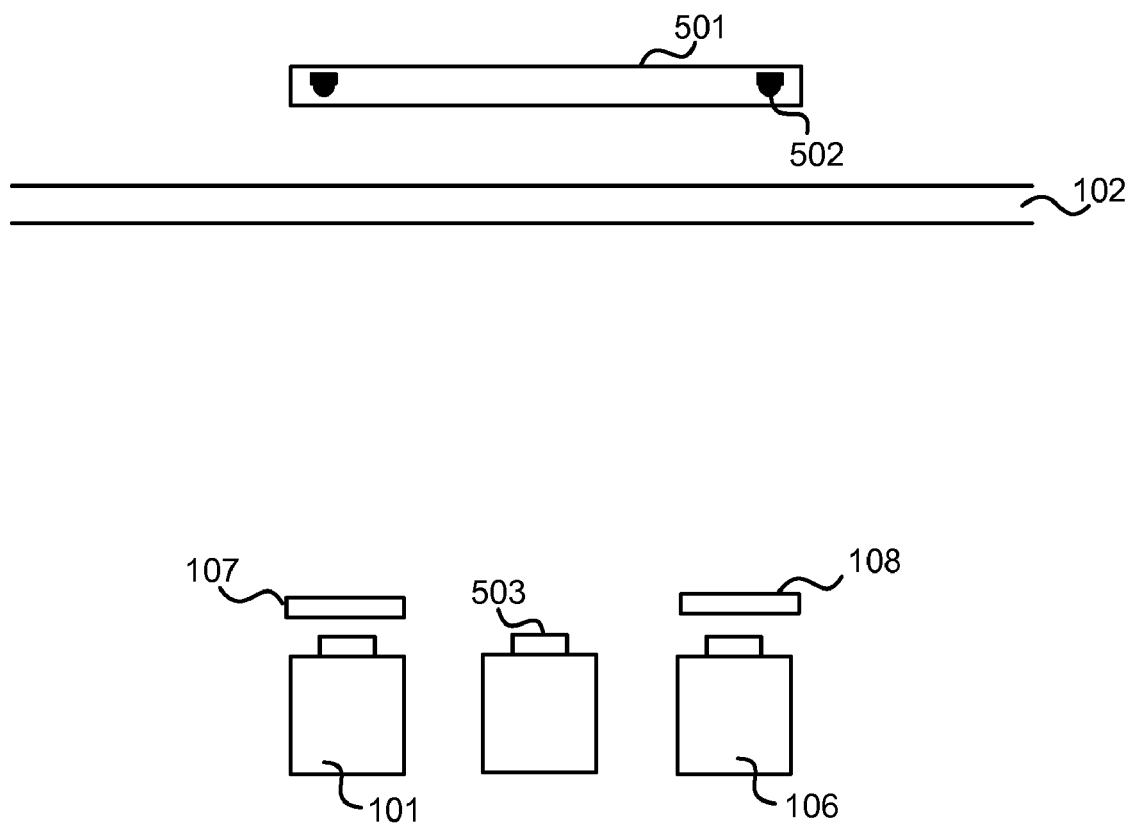
FIG. 5 shows a schematic diagram of an active object and a surface computing device.

In an example shown in FIG. 5, an object 501 may have LEDs 502 or other light sources embedded in them (e.g. at the corners) and the position of the object may be tracked by detecting the position of the LEDs through the switchable surface when in projection mode. In order to achieve this, a camera 503, image capture device or other imaging apparatus may be located behind the switchable surface 102. Where there is more than one object in proximity to the surface, different objects may use different flashing patterns (or different modulation schemes) in order to assist in distinguishing between them. In another examples, the LEDs in an object may be switched on/off in response to a received signal (e.g. a radio signal) and this may be used to distinguish between objects. In a further example, the object may comprise reflective elements (e.g. instead of active LEDs) which reflect at least a portion of the light projected through the switchable surface in projection mode. The light reflected from these elements may be detected by a camera or other imaging apparatus to enable the position of the object to be tracked.

An object may comprise other active electronics, in addition to or instead of LEDs or other light sources. For example, an object may comprise embedded electronics or devices to assist in determining the position and/or orientation of the object, such as a compass, an accelerometer, a tilt switch etc, and the object may communicate data from these sensors to the surface computing device using a wireless communications technology (e.g. IrDA, Bluetooth™, WiFi etc). Such devices may be used instead of, or in addition to, detection of light emitted or reflected by an object. The location and/or orientation of the object may be detected with reference to the switchable surface or with respect to another object or direction (e.g. with respect to gravity). Where light is emitted/reflected at the corners of an object, the additional data may be used to resolve ambiguities which may be caused by incomplete vision data (e.g. the image capture device has only captured three of the four corners) or to provide better position/tracking data. In another example, an object may comprise a camera or other image capture device and may communicate data which is indicative of the captured image to the surface computing device. By correlating the received data with any graphical data displayed on the switchable surface or projected through the surface, the surface computing device may determine the relative position of the object with respect to the surface.

Where an object is tracked, or its position otherwise determined, the graphical data projected onto the object may be modified according to the position of the object. In an example, the graphical data may be adjusted to correct for distortion which may be position dependent (e.g. as described in more detail below) or the projected graphical data may be different dependent on the position of the object (e.g. to provide an enlarged view of part of the graphical data displayed on the switchable surface in display mode, to provide a virtual magnifier). This provides a 3D display and enables 3D interactions by a user (e.g. where the user is moving the object relative to the switchable surface).

Figure 6:
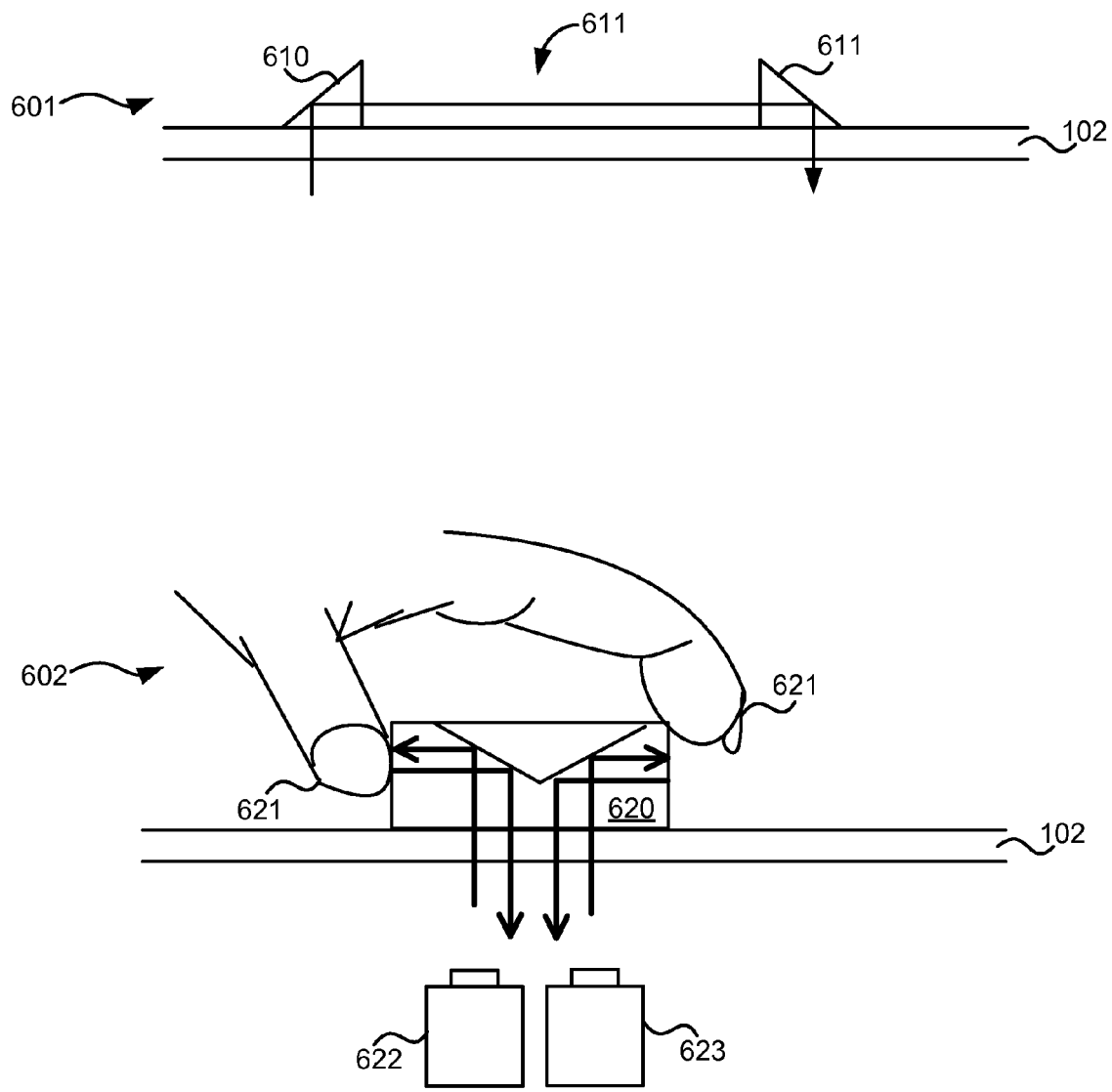
FIGS. 6-8 show schematic diagrams of surface computing systems which may be used for detecting user input.

The objects which are used in combination with the switchable surface may enable user input to the surface computing device through detection of their position on the surface (e.g. using object tracking as described above) and/or through detection of user interaction with the objects. Two example arrangements 601, 602 which enable detection of user interaction with an object are shown in FIG. 6. In the first example 601, two prisms 610, 611 placed on the surface 102 may be used to provide a beam-break sensor. Light projected through the surface in projection mode and into the base of one of the prisms 610 is reflected and passes across a gap 612 between the prisms. A camera or other imaging device may be used to detect light which is reflected back through the surface (in projection mode) by the second prism 611. The beam-break sensor may use visible light or may use another wavelength of light, such as infra-red (IR) radiation.

FIG. 6 shows a second arrangement 602 which enables user input through detection of a user touching an object 620 which is on (or near) the surface 102. This touch detection may be achieved by shining light on the base of the object (e.g. from a source 622 through the switchable surface 102) which is then redirected by the angled surfaces (as described above). When a user is touching the object, light incident on their fingers 621 is reflected and may be detected by an imaging apparatus 623. In an example, IR light may be used, such that the source 622 is an IR source and the imaging apparatus is an IR imaging apparatus, such as an IR sensitive camera. The projection and detection of the light may be performed when the surface 102 is in projection mode or alternatively, where IR light is used, the surface may be at least partially transparent to IR light in display mode, thereby allowing the projection and detection to be performed in display mode. Visible light may be projected through the surface in projection mode to project graphical data onto the object in addition to using it to provide user input.

In further examples, active objects (i.e. objects comprising electronic circuitry) may be used in conjunction with the switchable surface to provide user input. For example, although the arrangements 601, 602 in FIG. 6 show the light (e.g. IR light) being projected into the objects, in other examples the objects may be active objects and may comprise light sources (e.g. IR LEDs).

Figure 7:
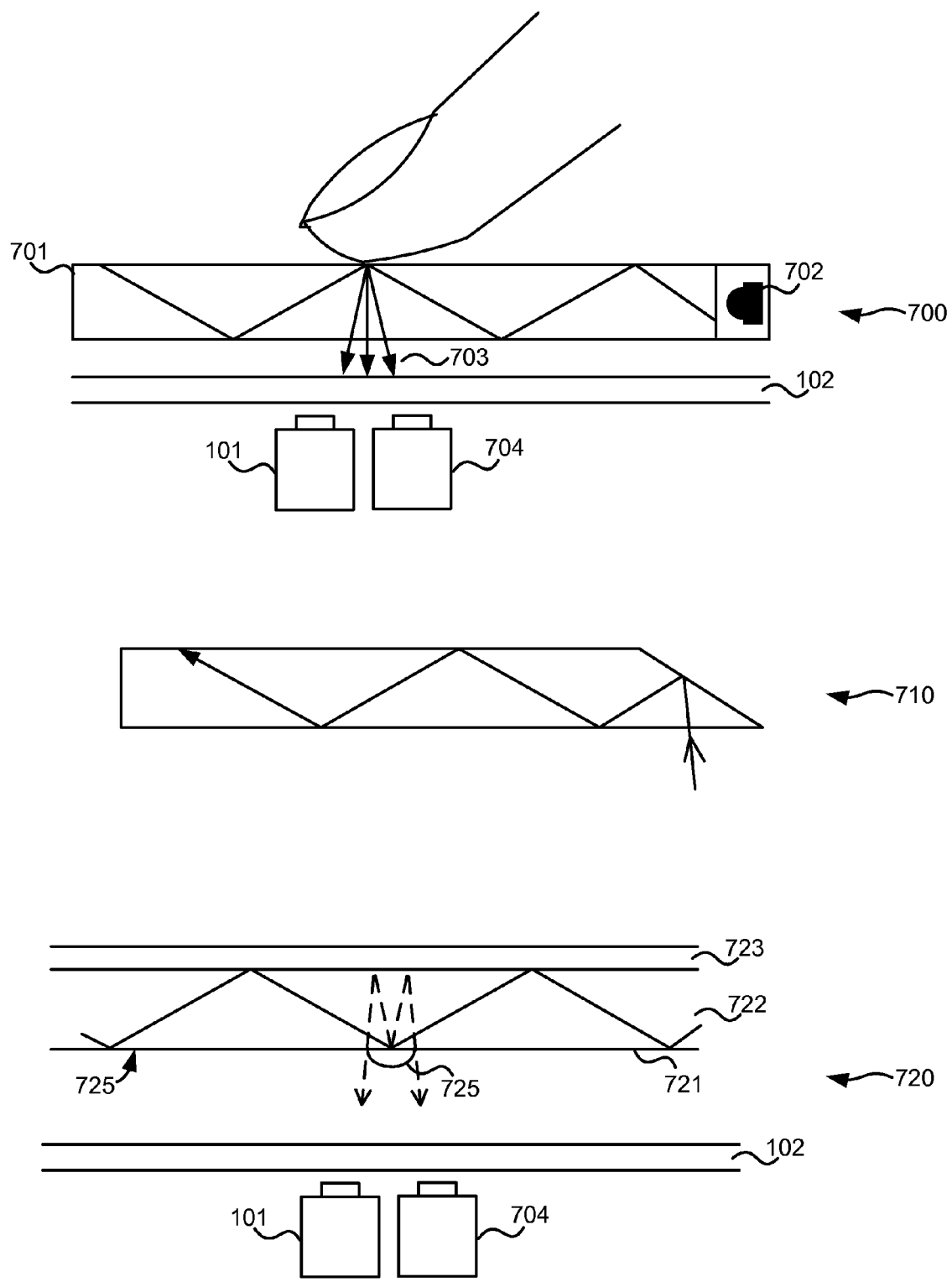

In an example, the active object may comprise a touchscreen. This touchscreen may use any suitable touchscreen technology, such as resistive or capacitive technology or FTIR (frustrated total internal reflection) as shown in FIG. 7 and described below. In an example, a touchscreen may comprise a switchable surface.

In an example 700, as shown in FIG. 7, an object 701 may comprise a light source 702 which couples light into the object such that it undergoes TIR within the object. When a user touches the object, the TIR is frustrated and light is scattered out of the object 703. This scattered light 703 may be detected by an imaging apparatus 704 which may be located on the other side of the switchable surface 102. The detection of the scattered light may be used to provide user input to the surface computing device and the user input may also be dependent on the position of the detected scattered light. The light used may be visible light or may be IR light. The device may further comprise a projector 101 arranged to project graphical data onto the object 701 in projection mode. In a further example 710, the object may be passive and light used for touch detection based on FTIR may be projected through the surface and coupled into the object using a mirrored face or prismatic element. The objects 701, 710 may also comprise regions where the surface is roughened (or otherwise treated) in order to frustrate the TIR. Light scattered by such regions may be detected by an imaging apparatus (e.g. apparatus 704) and used to track the position of the object relative to the switchable surface 102.

The first two arrangements 700, 710 shown in FIG. 7 enable tracking of fingers in contact with the front surface of the object (i.e. the surface which is distant from the switchable surface). A third arrangement 720 shown in FIG. 7 enables tracking of fingers on the opposite side of the object (i.e. on the surface of the object closest to the switchable surface, which may be referred to as the back or the bottom surface). The object 721 comprises a layer 722 in which TIR occurs, where the IR light may be provided by LEDs in the object (as in arrangement 700) or may projected onto and coupled into the object (as in arrangement 710). The object 721 also comprises an IR reflective surface 723. When a user touches the back surface 724 of the object (e.g. using a fingertip 725), the TIR is frustrated and the scattered IR light is reflected by the reflective surface 723 and detected using IR imaging apparatus 704.

Figure 8:
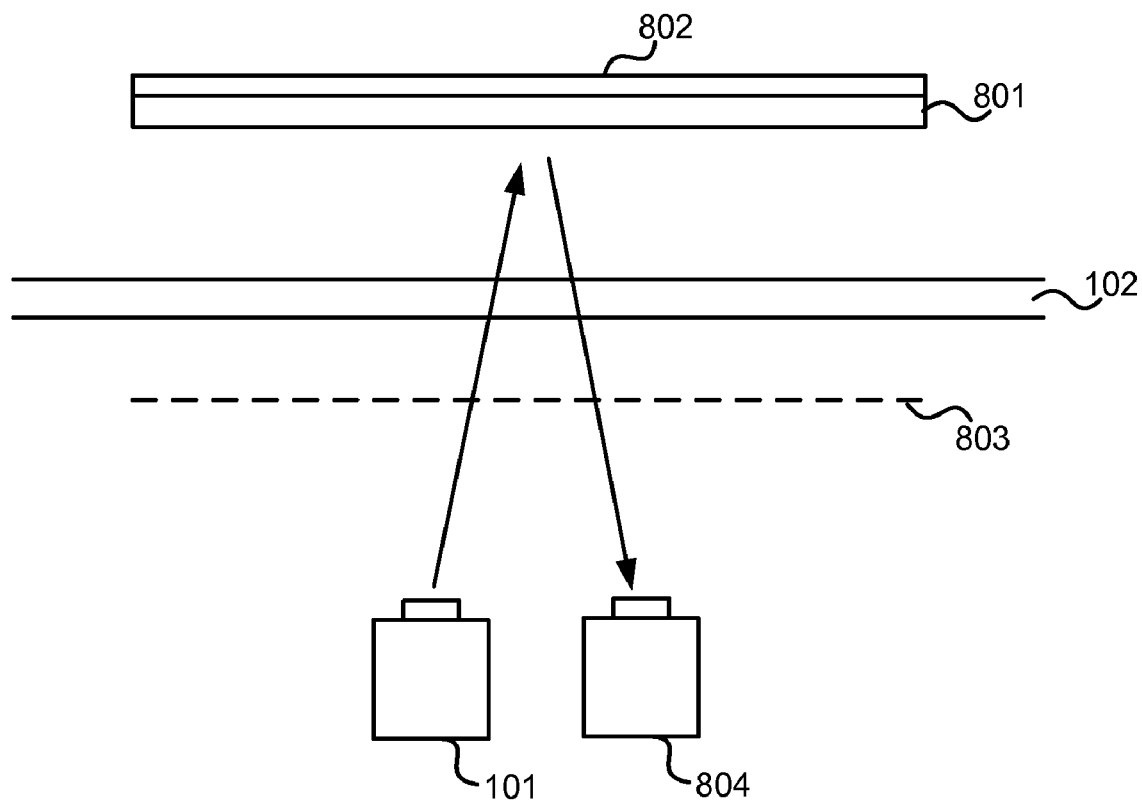

In a further example, user inputs may be provided by flexing or otherwise distorting the object onto which light is projected through the switchable surface in projection mode. The flexing of the object may be detected by tracking the position of the object or parts of the object (e.g. the corners and/or edges) and this may be achieved using one of the techniques described above. In another example, as shown in FIG. 8, the flexing may be detected through detection of a change in optical properties of the object, e.g. using polarized optical distortion. A polarized light source, which may comprise projector 101 (or another light source) and a polarizer 803 may be used to project polarized light onto the object 801, which may, for example, be a polycarbonate or acrylic sheet. Having passed through the object, the light may be reflected by a reflective coating 802 on the front surface (i.e. the surface closest to the user and distant from the switchable surface 102) and pass back through the polarizer 803 to be detected (e.g. using a camera system 804). Any suitable object may be used where the effect on the polarization of light when passing through it is related to the amount of stress in the material. When forces are applied by a user to the object, the optical polarizing properties of the sheet change such that the amount of rotation of polarization of the light passing through any part of the object is dependent on the strain (i.e. different parts of the sheet will experience different strain which will result in a different change to the polarization of light passing through it). As a result, the detected image provides a map of the strain on the sheet which may be interpreted to determine the user action (or resultant force) which caused it.

In an example, a touchscreen may be used in combination with the surface computing device to create a document which appears to a user to be touch-sensitive. In such an example, a touchscreen which is transparent (or comprises a switchable surface) may have a printed document placed on top of it. The touchscreen may detect a user touching the document and the projector in the surface computing device may project additions onto the document, e.g. in response to the detected user inputs via the touchscreen.

Figure 9:
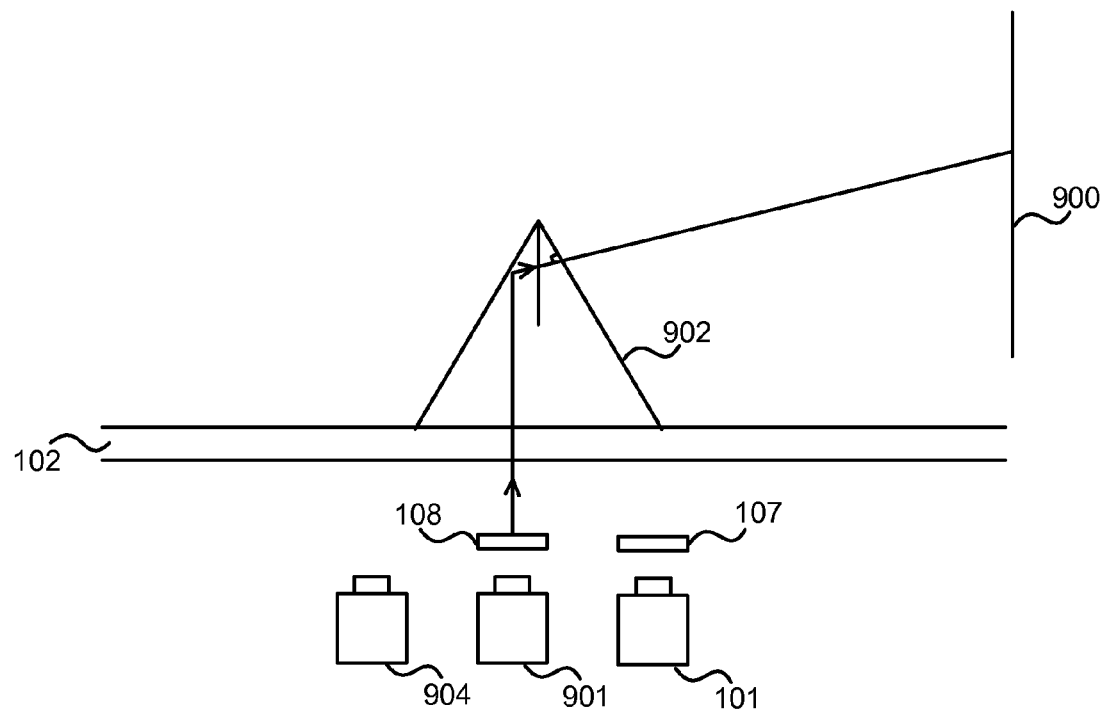
FIG. 9 is a schematic diagram of another surface computing device.

In the examples described above, the graphical data projected through the switchable surface is displayed on the object which is on or near the surface and which redirects the light. In other examples, the object may redirect the light onto another projection surface, such as a wall, ceiling or projection screen. In some examples, projection screens may be placed appropriately for use as extended projection space around the surface computing device, as shown in FIG. 9. In order to be able to project onto an alternative projection surface 900, one of the projectors may be orientated such that is off-axis. The system of FIG. 9 also comprises a separate projector 101 for projection of graphical data onto the surface in display mode.

Whilst FIG. 9 shows a prismatic object 902, the object may alternatively comprise a mirrored surface or may redirect the light in any other way. In an example, light may be projected onto a mirrored surface (e.g. mounted on the ceiling above the switchable surface) and reflected onto an object (e.g. onto the top surface of an object and/or onto an object which is not optically transparent). The mirrored surface may be steerable and may be steered to track any movement of the object (which may be tracked as described above). In a further example, an object may be used which provides 360° projection (e.g. a hemisphere silvered on the outside or a cone mirrored on the outside).

In some examples, the position of the object which is used to redirect the light onto an alternative projection surface may be tracked to enable the projected graphical data to be compensated. By tracking the angle of the object relative to the switchable surface, the projected graphical data may be modified such that the projected graphical data maintains a constant orientation, size or shape (e.g. rectangular rather than being a different parallelogram shape or trapezoid). In a variation on such an example, this may be implemented in a virtual manner. Graphical data may be projected onto an object through the surface in projection mode (as before) and the object may be tracked as it is manipulated by a user. Another projector may then be used to project the graphical data directly onto the alternative projection surface (i.e. without being redirected by the object) where the position of the directly projected graphical data may be dependent on the position of the object relative to the surface computing device. The user perception may be the same for both these examples.

In a further example, the position of users around the switchable surface may be tracked and the projected graphical data may be modified to avoid projecting graphical data onto faces of users. This may be implemented by adding black regions to the graphical data projected which are positioned and adjusted according to the tracked position of a user's face. This tracking of users may be implemented using imaging apparatus 904.

Some of the objects described above include embedded electronics or other active devices, such as LEDs. The power for these devices may be provided by a battery located within the object. Alternatively, or in addition, power may be provided wirelessly by the surface computing device. In an example, an object may comprise a photovoltaic cell or other element capable of converting incident optical energy into electrical energy. The incident optical energy may be projected through the switchable surface in projection mode and the resultant electrical energy may, for example, be used to power LEDs or other light sources. In an alternative arrangement, power may be inductively coupled into the object from the surface computing device or other wireless powering techniques may be used. In some examples, the power which is provided by the surface computing device (e.g. inductively or through optical-electrical conversion) may be used to recharge a battery within the device. In order to reduce the power consumption of an active device, the active elements may only be powered for part of the time. In an example, the active devices may be powered when the switchable surface is in projection mode.

Figure 10:
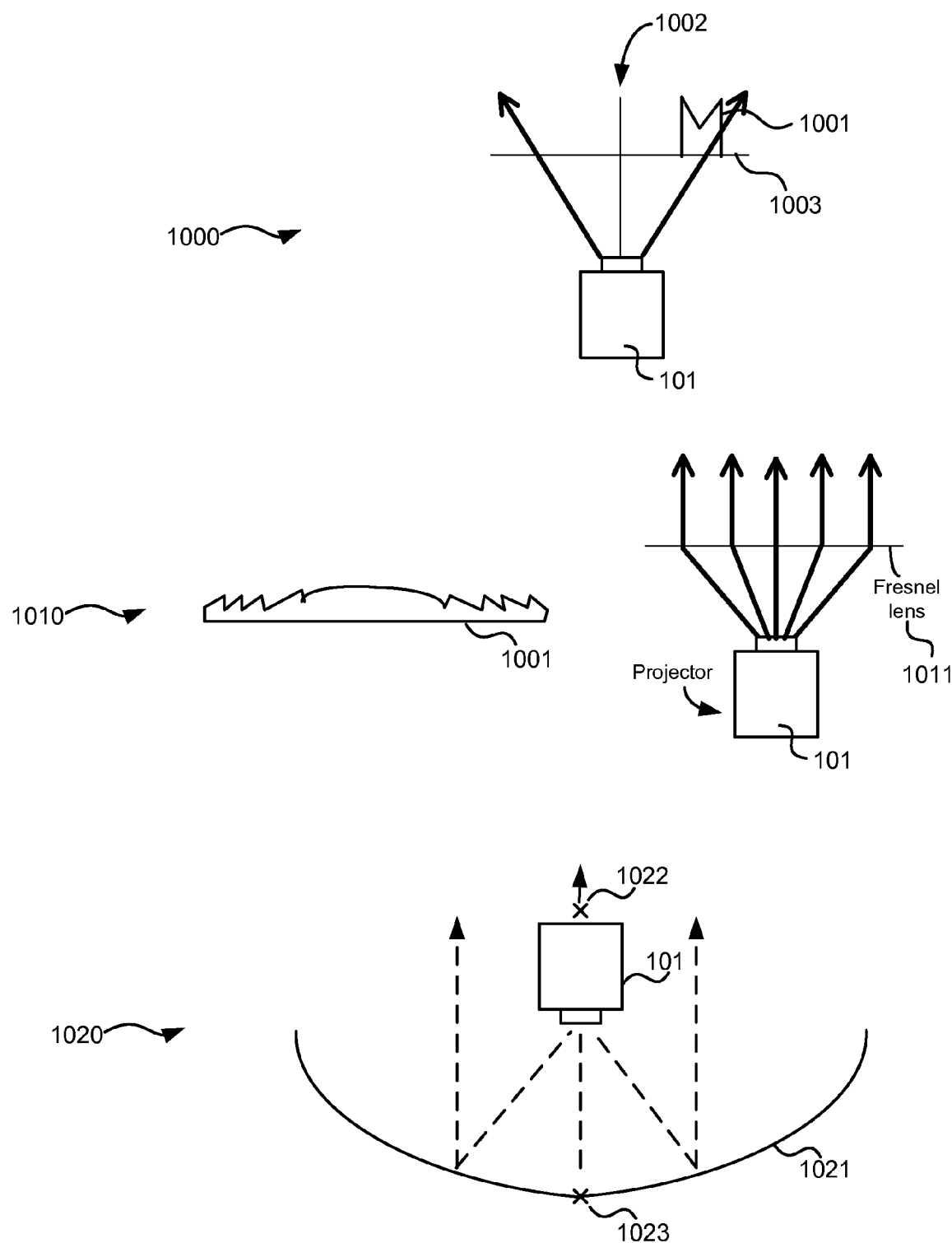
FIG. 10 shows schematic diagrams of optical arrangements for correcting distortion.

In some examples, the projected graphical data may be distorted due to the divergence of the rear-projected graphical data. When an object is placed on the switchable surface on the optical axis of the projected graphical data, the rays of light entering the object are near perpendicular to the top/bottom faces of the object. However, as shown in a first arrangement 1000 in FIG. 10, when an object 1001 is placed on the switchable surface 102 off the optical axis 1002, the light entering the object 1001 is no longer perpendicular to the bottom face, and as shown in FIG. 10, this may cause the incident light to pass through the object without being incident on the prism. A solution to this is to include a Fresnel lens 1011 that is centered on the optical axis and that covers substantially the whole of the projection area of the switchable surface. The Fresnel lens may be selected so that its focal length is equal to the distance between the projector and the switchable surface. The result is that the divergent light from the projector 101 is focused into parallel rays and this emerges perpendicular to the surface, as shown in the second arrangement 1010 in FIG. 10.

A Fresnel lens 1011, such as that shown in FIG. 10, provides a thin form factor lens, but in other examples alternative lenses may be used (e.g. a collimating lens or shallow GRIN lens). In a further example 1020, a parabolic mirror 1021 may be used to provide a collimated projected image through the switchable surface in projection mode, as shown in FIG. 10 or alternatively an array of individual mirror elements may be used to provide the same optical effect. In the example shown in FIG. 10, an imaging apparatus, where required, may be located in front of the parabolic mirror (e.g. at position 1022), behind an aperture in the parabolic mirror 1023, beside the projector 101 directed at the parabolic mirror 1021 or elsewhere. Other optical techniques may alternatively be used to provide a collimated projected beam.

In an alternative solution to use of a lens, the graphical data may be tracked (as described above) and the projected graphical data may be adjusted based on the detected position of the object in order to correct for any distortion. In a further alternative solution, the projector which projects through the surface and onto objects may be located on a movable mount (e.g. on an x-y stage) and the position of the projector may be changed to track the position of the object onto which it is projecting. In yet a further example, multiple projectors may be provided and a projector may be selected to project the graphical data according to a tracked location of the object (e.g. the projector with an optical axis which is closest to the position of the object may be used).

The objects in the examples described above are monolithic objects; however in other examples, an object may comprise a mechanical joint. In an example, an object may comprise a mouse replacement device and include a scroll wheel, the position of which may be tracked (as described above) to provide a user input to a surface computing device. In further examples, the object may be an animate object (e.g. a person), may not be a solid (e.g. may be a mist) or may be a holographic device. The object may be rigid or flexible (e.g. a flexible fiber guide).

The surface computing device may comprise additional elements to those shown in the FIGS. and described above. For example, the surface computing device may comprise an image capture device or other imaging apparatus arranged to perform imaging through the surface in projection mode and/or imaging in display mode (when the surface is substantially diffuse). The imaging may use any wavelength, such as visible or IR radiation.

Figure 11:
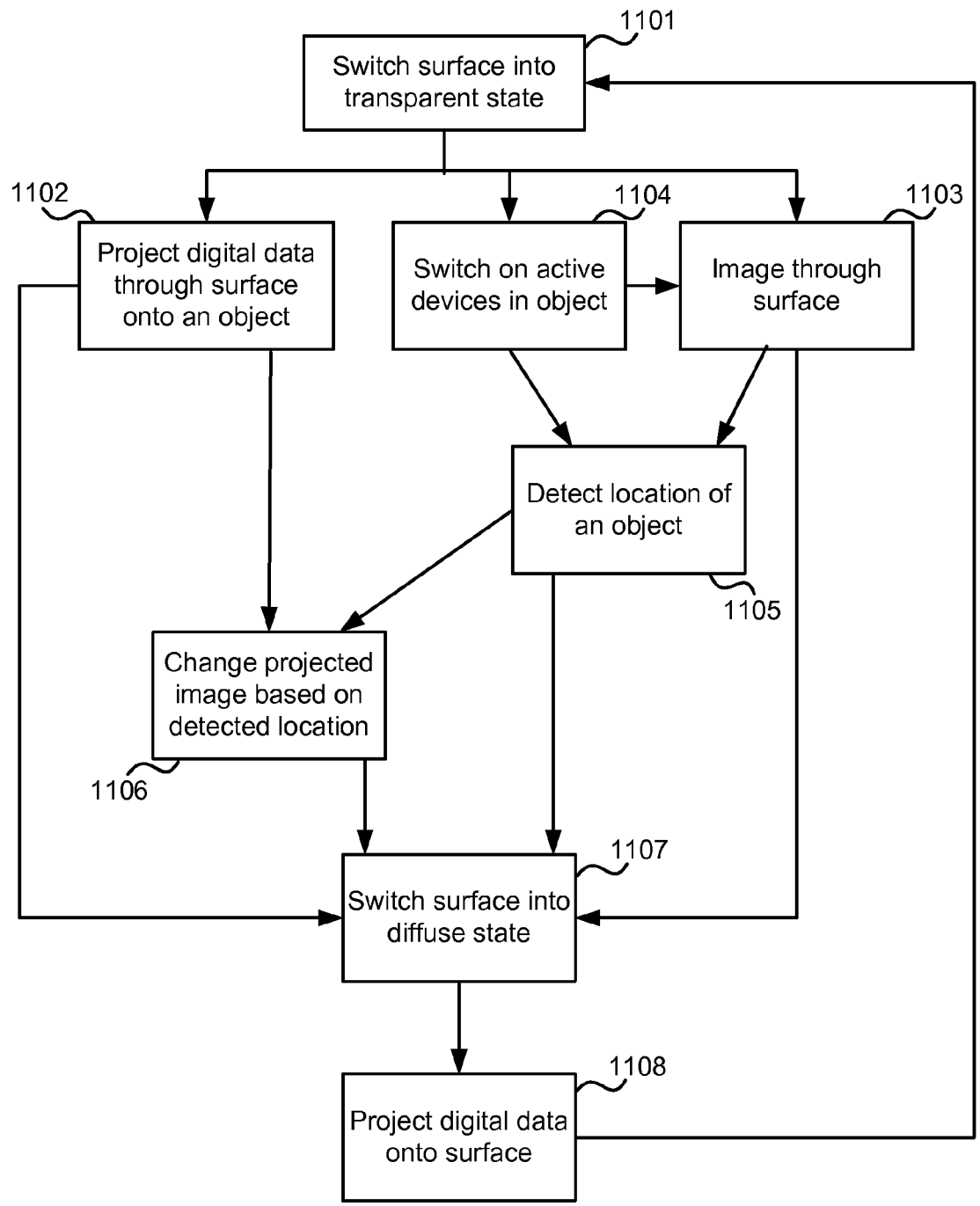
FIG. 11 shows a flow diagram of another example method of operation of a surface computing device.

FIG. 11 is a flow diagram showing an example method of operation of a surface computing device, such as any of the devices described herein and shown in FIGS. 1 and 5-10, which may operate with an object, such as any of the objects described herein and shown in FIGS. 1 and 3-10. With the surface in its transparent state (as switched in block 1101), which is referred to as projection mode, graphical data is projected through the surface onto an object (block 1102). The object may be in contact with the surface, near the surface or distant from the surface. In addition to projecting graphical data through the surface in projection mode, graphical data may be captured through the surface (block 1103). This image capture (in block 1103) may include illumination of the surface (not shown in FIG. 11). Where devices include electronic circuitry, the electronic circuitry may be switched on (block 1104) when the surface is in transparent state. The captured image (from block 1103) may be used in detecting the location of objects through the surface (block 1105) or alternatively, the location may be determined (in block 1105) based on information received from the electronic devices within the object. Based on the detected location (from block 1105), the projected graphical data may be changed (block 1106). The captured image (from block 1103) and/or the detected location of the object (from block 1105) may be used to identify a user input (block 1109) and this may then be used to control a program (e.g. an application) running on the surface computing device (block 1110). With the surface in its diffuse state (as switched in block 1107), which is referred to as display mode, graphical data is projected onto the surface (block 1108).

The process may be repeated, with the surface (or part thereof) being switched between modes (i.e. between diffuse and transparent states) at any rate. In some examples, the surface may be switched at rates which exceed the threshold for flicker perception. In other examples, where projection through the surface only occurs periodically, the surface may be maintained in display mode (i.e. in its diffuse state) until projection is required and then the surface may be switched to projection mode (i.e. switched to its transparent state).

Figure 12:
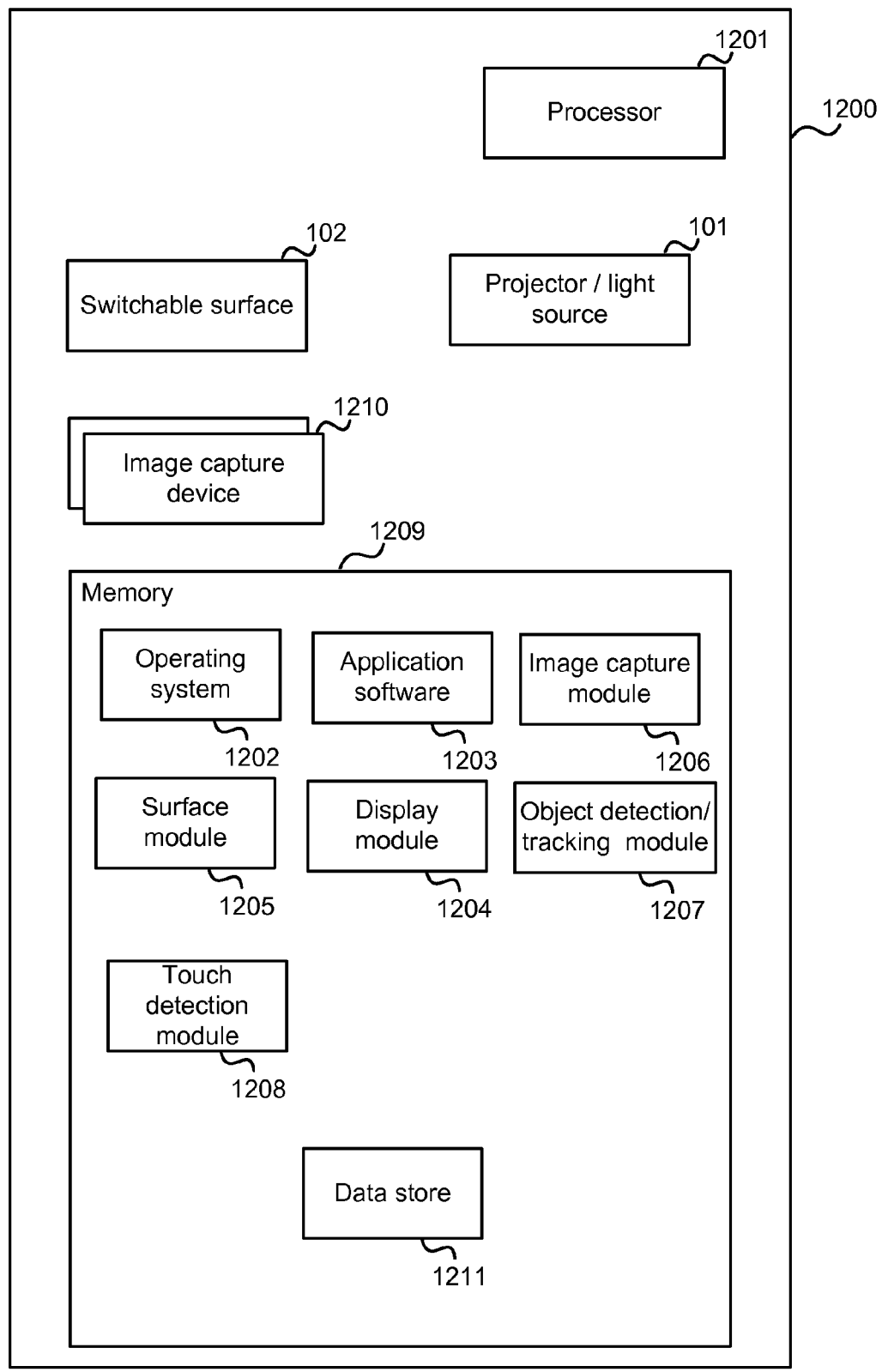
FIG. 12 illustrates an exemplary computing-based device in which embodiments of the methods described herein may be implemented.

FIG. 12 illustrates various components of an exemplary surface computing-based device 1200 which may be implemented as any form of a computing and/or electronic device, and in which embodiments of the methods described herein (e.g. as shown in FIGS. 2 and 11) may be implemented.

Computing-based device 1200 comprises one or more processors 1201 which may be microprocessors, controllers or any other suitable type of processors for processing computing executable instructions to control the operation of the device in order to operate as described above (e.g. as shown in FIG. 2 or 11). Platform software comprising an operating system 1202 or any other suitable platform software may be provided at the computing-based device to enable application software 1203-1208 to be executed on the device.

The application software may comprise one or more of:

- A display module 1204 arranged to control the projectors 101, 106 (and potentially any shutters 107, 108 associated with the projectors and FTIR light sources and wireless communications to objects in the field of view);
- A surface module 1205 arranged to cause the switchable surface 102 to switch between modes (i.e. between substantially transparent and diffuse states);
- An image capture module 1206 arranged to control an image capture device 1210;
- An object detection/tracking module 1207 arranged to determine, and in some cases additionally track, the position of an object relative to the surface 102; and
- A touch detection module 1208 arranged to detect touch events (e.g. as described above with reference to FIG. 6 or 7).

Each module is arranged to cause the switchable surface computer to operate as described in any one or more of the examples above.

The computer executable instructions, such as the operating system 1202 and application software 1203-1208, may be provided using any computer-readable media, such as memory 1209. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also comprise a data store 1211 which may be used to store captured images and/or digital data for display etc.

The computing-based device 1200 also comprises a switchable surface 102, one or more projectors 101, 106 and, in some examples, one or more image capture devices 1210. The device may further comprise one or more additional projectors, an FTIR subsystem, wireless subsystem (e.g. to communicate with the objects), switchable shutters, a light source etc. The computing-based device 1200 may further comprise one or more inputs (e.g. of any suitable type for receiving media content, Internet Protocol (IP) input etc), a communication interface and one or more outputs such as an audio output.

Although the present examples are described and illustrated herein as being implemented in a surface computing system, the system described is provided as an example and not a limitation. As those skilled in the art will appreciate, the present examples are suitable for application in a variety of different types of computing systems.

The above examples refer to use of passive or active objects in combination with a switchable surface. It will be appreciated that passive and active objects may combined and an object may have a portion which operates passively and a portion which operates actively (due to the electronic circuitry within the object). Furthermore, objects may be stacked, such that the graphical data projected through a first object is also projected onto (and in some examples through) a second object and each of these objects may be passive or active.

The above examples show the switchable surface being orientated horizontally and describe the location of objects as being above/below or in front/behind the surface. It will be appreciated that this orientation is shown and described by way of example only and the surface may be positioned in any orientation. Furthermore, as described above, the surface may not be planar but may be curved and/or flexible. In an example, the surface computing device may be mounted such that the switchable surface is vertical and the objects onto which graphical data is projected (in projection mode) may be a user's hands.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A surface computing device comprising:
one or more processors;
a surface layer that is diffusing to visible light in a first state and transparent to visible light in a second state; and
a projector, operable by the one or more processors, to project first graphical data onto at least a first part of the surface layer configured to be in the first state and second graphical data through at least a second part of the surface layer configured to be in the second state, wherein the projector concurrently projects the first graphical data and the second graphical data.

2. A surface computing device according to claim 1, wherein the second graphical data is projected through at least the second part of the surface layer and onto a display surface other than the surface layer.

3. A surface computing device according to claim 1, wherein the first graphical data is associated with a first image and the second graphical data is associated with a second image, the first image and the second image being visually connected images.

4. A surface computing device according to claim 1, wherein the second graphical data illustrates a higher level of detail of the visually connected images compared to the first graphical data.

5. A surface computing device according to claim 1, further comprising an object detection module, operable by the one or more processors, to detect a location of an object relative to the surface layer.

6. A surface computing device according to claim 5, wherein the second graphical data projected through at least the second part of the surface configured to be in the second state is dependent upon the detected location of the object.

7. A surface computing device according to claim 1, further comprising an object detection module, operable by the one or more processors, to detect an orientation of an object relative to the surface layer.

8. A surface computing device according to claim 7, wherein the second graphical data projected through at least the second part of the surface configured to be in the second state is dependent upon the detected orientation of the object.

9. A method of operating a computing device comprising:
identifying first graphical data to be displayed on a first portion of a surface layer of the computing device in a first mode of operation that is diffusing to visible light;
identifying second graphical data to be projected through at least a second portion of the surface layer of the computing device in a second mode of operation that is transparent to visible light;
projecting the first graphical data onto the first portion of the surface layer; and
projecting the second graphical data through the second portion of the surface layer onto a separate display surface, wherein the first graphical data and the second graphical data are projected simultaneously.

10. A method according to claim 9, further comprising:
detecting a position of an object relative to the surface layer; and
changing the second graphical data projected through the second portion of the surface layer according to the detected object position.

11. A method according to claim 9, wherein the first graphical data is associated with a first image and the second graphical data is associated with a second image, the first image and the second image being visually related images.

12. A method according to claim 11, wherein the second graphical data illustrates a higher level of detail of the visually related images compared to the first graphical data.

13. A method according to claim 9, further comprising:
detecting a position of an object relative to the surface layer; and
switching the first portion of the surface layer from the first mode of operation that is diffusing to visible light to the second mode of operation that is transparent to visible light based at least in part on the detected object position.

14. A method according to claim 9, further comprising:
detecting a position of an object relative to the surface layer; and
switching the second portion of the surface layer from the second mode of operation that is transparent to visible light to the first mode of operation that is diffusing to visible light based at least in part on the detected object position.

15. A computing system comprising:
one or more processors;
a surface module, operable by the one or more processors, that selectively switches one or more parts of a surface layer between a first state that is diffusing to visible light and a second state that is transparent to visible light; and
one or more projectors, operable by the one or more processors, that concurrently project i) first graphical data onto a first part of the surface layer configured in accordance with the first state, and ii) second graphical data through a second part of the surface layer configured in accordance with the second state.

16. A computing system according to claim 15, further comprising an object operable to redirect the second graphical data onto a display surface associated with the object.

17. A computing system according to claim 15, wherein the first graphical data is associated with a first image and the second graphical data is associated with a second image, the first image and the second image being visually connected images.

18. A computing system according to claim 17, wherein the second graphical data illustrates a higher level of detail of the visually connected images compared to the first graphical data.

19. A computing system according to claim 15, further comprising an object detection module, operable by the one or more processors, to detect a location of an object relative to the surface layer.

20. A computing system according to claim 19, wherein the surface module is arranged to identify the second part of the surface layer configured in accordance with the second state based at least in part on the detected location of the object.

* * * * *